Aug. 6, 1935.　　　　　G. F. WIKLE　　　　　2,010,122
FESTOONING DEVICE
Filed May 18, 1933
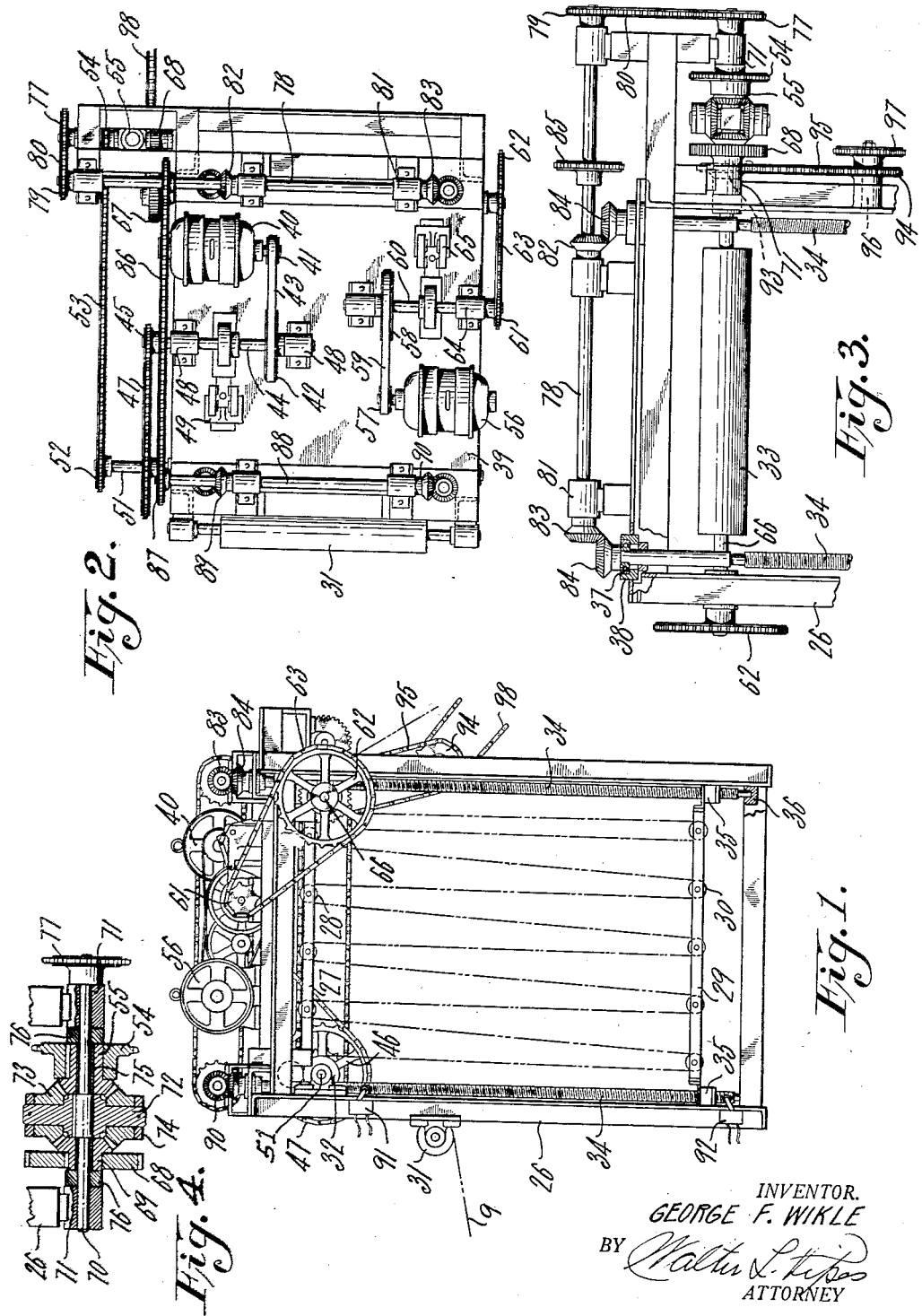
INVENTOR.
GEORGE F. WIKLE
BY
ATTORNEY Patented Aug. 6, 1935

2,010,122

UNITED STATES PATENT OFFICE 2,010,122

FESTOONING DEVICE

George F. Wikle, Detroit, Mich., assignor, by mesne assignments, to United States Rubber Company, New York, N. Y., a corporation of New Jersey Application May 18, 1933, Serial No. 671,709

6 Claims. (Cl. 271—2.2)

My invention relates to storing or festooning devices for temporarily storing fabric between supplying means and withdrawing means, and more particularly to means for controlling the relative positions of groups of draping rollers in accordance with the supply of material to the device and the withdrawal of the material therefrom, and even though the supplying and discharging means are operating simultaneously.

For many purposes it is desired to drape fabric material between spaced series of relatively movable rollers during the passage of the fabric from a source of supply to a consuming device. As the supply speed and the withdrawal speed of such devices are usually irregular and as it is desired to have the material under constant tension, I provide means for positively changing the relative positions of the groups of rollers in accordance with the net increase or decrease in the amount of the material in the device. To this end one of the series of rollers is mounted on a frame which, in turn, is actuated by screw threads towards and away from a fixed series of rollers. A motor is provided for controlling the feeding means and a second motor is provided for controlling the discharging means Differential gearing is connected between the two motors for driving the screw threads in accordance with the net increase or decrease in the amount of the material in the device at any time With this construction the fabric may be fed to the device while none is being withdrawn. Fabric may be withdrawn from the device while none is being supplied. Both the feeding and discharging means may operate simultaneously while maintaining the desired tension on the fabric.

A present preferred embodiment of the invention is illustrated in the accompanying drawings in which:—

Fig. 1 is a side elevational view of the festooning or storing device;

Fig. 2 is a plan view thereof;

Fig. 3 is a partial end view of the device, looking from the right in Fig. 1; and Fig. 4 is an enlarged detail view, in section, of a differential drive shown in Figs. 2 and 3.

In general, the storage or festooning device comprises a structural framework 26 retaining a fixed frame 27 supporting a series of spaced rollers 28, and a vertically movable frame 29 supporting spaced rollers 30. Stock 9 passes around an idler roller 31 attached to the frame 26, and thence around a positively driven roller 32. From roller 32 the stock passes up and down, around alternating rollers 28 and 30, so as to form a series of loops within the storage device. The stock then passes around a second positively driven roller 33 for feeding the stock from the storage device to the next succeeding operation. Both the roller 32 for feeding the stock into the storage device and roller 33 for removing it therefrom are driven by independent power means, and a compensating means as hereinafter described interposes the two drives so as to prevent conflicting movement of the vertical moving bar 29.

Vertical movement of the frame 29 is produced by positive operable means comprising rotatably threaded rods 34 positioned at each of the four corners of the structural framework 26. These rods 34 associate with complementary threaded blocks 35 extending from the vertically movable frame 29. The rods 34 are supported at their lower ends by bearings 36 attached to the structural framework 26. The upper ends of the rods 34 are retained by roller bearings 37 supported by brackets 38 retained by the structural framework 26.

A table plate 39 is positioned on top of the structural framework, and supports the various power supplying means for operating the storage device. A motor 40 operates to drive the positively driven feed roller 32 through pulleys 41 and 42, belt 43, shaft 44, sprockets 45 and 46, and chain 47. The shaft 44 is supported by bearing blocks 48 attached to the table plate 39.

Interposing blocks 48, and connected with the shaft 44, is a conventional magnetic brake 49 which cooperates with the motor 40 so as to prevent rotation of the shaft 44 during such time as the motor 40 is not in operation.

The motor 40 is controlled by a foot pedal switch (not shown) which is controlled by the splicing operator when it is desired to feed a strip of stock into the storage device.

Shaft 51 on which the driven roller 32 is retained also contains a sprocket 52 which, through a chain 53, drives a sprocket 54 (Figs. 3 and 4, respectively) keyed to a mitre gear 55, forming a part of a differential unit shown in particular in Fig. 4.

A second motor 56, which is the principal source of power for the entire apparatus, is positioned on the table plate 39, and drives roller 33 for removing stock from the storage device, through pulleys 57 and 58, belt 59, shaft 60, sprockets 61 and 62, and chain 63.

Shaft 60 is supported at each end by bearing blocks 64 attached to the table plate 39. Interposing these blocks 64, and associated with the shaft 60 is a second conventional magnetic brake 65. This magnetic brake mechanism cooperates with motor 56 so as to hold the rotatable elements rigid when the motor is not in operation.

In addition to operating the festooning device, the motor 56 which is controlled by a hand operated switch (not shown) may also operate associated units. The opposite end of shaft 66, supporting the roller 33, carries a gear 67 (Fig. 2) which meshes with gear 68 keyed to mitre gear 69, forming a part of the differential mechanism (Fig. 4).

The differential mechanism shown in Fig. 3, and in particular in Fig. 4, comprises a central shaft 70 supported by bearing blocks 71 attached to the structural framework 26. The purpose of this differential mechanism is to form a compensating means between the two power units, so as to drive or reverse the threaded rods 34, depending on the quantity of stock which is present within the storage unit.

Spider 72 is keyed at the intermediate point of shaft 70, and rotatably supports crown gears 73 retained by rollers 74. The crown gears 73 operate to engage with mitre gear 55 driven from motor 40, and also to engage with mitre gear 69 driven from the motor 56. Mitre gears 55 and 69 are rotatably retained on the shaft 70, and the bushings 75 facilitate this purpose. Collars 76 have for their purpose merely to act as a spacing medium between the bearing blocks 71 and the differential mechanism.

Sprocket 77 is keyed to the end of the shaft 70, and drives shaft 78 through sprocket 79 and chain 80. Shaft 78 is attached to the top of the structural framework 26 through supporting bearing blocks 81. Shaft 78 also carries mitre gears 82 and 83 which mesh with mitre gears 84 keyed to the upper end of the threaded rods 34. Shaft 78 further carries a sprocket 85 which, through chain 86, drives sprocket 87 attached to a shaft 88 carrying mitre gears 89 and 90 for driving the second set of threaded rods 34.

Referring to Fig. 4, I show gear 68 which is driven from motor 56, sprocket 54 driven from motor 40, and sprocket 77 which, through the differential mechanism, is driven or reversed for rotating the threaded rods 34. Assuming that motor 56 is stopped and motor 40 is in operation, the sprocket 54 will be driven, the gear 68 will remain still by reason of the magnetic brake 65. Motion will then be transmitted from sprocket 54 to mitre gear 55, thence to shaft 70 through the crown gears 73. By reason of the mitre gear 69 being held non-rotatable, the crown gears 73 will rotate about the mitre gear 69, and transmit rotary motion by way of the spider 72 to the shaft 70 so as to drive the sprocket 77. This motion operates to rotate the sprocket 77 in an opposite direction, and to lower the bar 29 so as to enlarge the supply of stock retained in the festoon device.

Assuming that motor 40 is stopped and motor 56 is set into operation, the mechanism as shown in Fig. 4 will operate to change the directional movement of the sprocket 77, and thus to elevate the bar 29 to diminish the supply of stock within the festoon device.

If both motor 40 and motor 56 should be operating at the same time, the reversed directional movement between the gears 68 and the sprocket 54 will operate to maintain the sprocket 77 in motionless position, or to rotate slightly, depending on the differential in speed of the incoming stock or its removal from the storage unit.

In addition to hand operating or foot operating switches for controlling the motors 40 and 56, I also provide safety switches 91 and 92 which cooperate with the complementary threaded block 35 so as to cut off the circuit of the appropriate motor when the bar 29 has reached its maximum range of movement.

Attached to one end of the driven shaft 66 is a sprocket 93 (Fig. 3) which drives sprocket 94 through a chain 95. Sprocket 94 rotates on an auxiliary shaft 96 which carries a second sprocket 97, and by means of a chain 98 meshing therewith power may be transmitted to subsequent or associated operating units.

While I have shown and described a present preferred embodiment of the invention, it is to be understood that the invention may be otherwise embodied within the spirit thereof and the scope of the appended claims.

Having thus described my invention, what I claim and desire to protect by Letters Patent is:

1. A festooning device comprising a frame, relatively movable supports mounted in said frame, draping rollers carried by the supports, means for feeding fabric to the device and for adjusting the relative positions of the supports, means for discharging fabric and for adjusting the relative positions of said supports, and means for controlling the relative positions of said supports during the simultaneous operation of the feeding and discharging means.

2. A festooning device comprising a frame, relatively movable supports mounted in said frame, draping rollers carried by the supports, means for feeding fabric to the device and for adjusting the relative positions of the supports, means for discharging fabric and for adjusting the relative positions of said supports, and differential gearing connecting said feeding and discharging means to adjust the relative positions of said supports during simultaneous operation of the feeding and discharging means.

3. A festooning device comprising a frame, relatively movable supports mounted in said frame, draping rollers carried by the supports, means comprising a motor for feeding fabric to the device and for adjusting the relative positions of the supports, means comprising a motor for discharging fabric and for adjusting the relative positions of said supports, and means for controlling the relative positions of said supports during simultaneous operation of said motors.

4. A festooning device comprising a frame, relatively movable supports mounted in said frame, draping rollers carried by the supports, means comprising a motor for feeding fabric to the device and for adjusting the relative positions of the supports, means comprising a motor for discharging fabric and for adjusting the relative positions of said supports, and differential gearing connected between said motors for controlling the relative positions of said supports during simultaneous operation of the motors.

5. A festooning device comprising a frame, relatively movable supports mounted in said frame, draping rollers carried by the supports, means comprising a motor for feeding fabric to the device and for adjusting the relative positions of the supports, means comprising a motor for discharging fabric and for adjusting the relative positions of said supports, means for controlling the relative positions of said supports during simultaneous operation of said motors, and limit switches responsive to the movement of one of said supports for controlling the motors.

6. In a festooning device, a frame, series of draping rollers mounted therein and having relative movement, screw threads for actuating one of the series of draping rollers, means for feeding material to the device comprising a motor, means for discharging material from the device comprising a second motor, and differential gearing connected between said motors and said screw threads for actuating the latter in accordance with the changes in the amount of material in the device during feeding the material thereto and/or withdrawal of the material therefrom.

GEORGE F. WIKLE.